United States Patent [19]

Schwartz et al.

[11] Patent Number: 4,946,509

[45] Date of Patent: Aug. 7, 1990

[54] DIARYLIDE PIGMENT COMPOSITIONS

[75] Inventors: Russell J. Schwartz; Manuel Z. Gregorio, both of Cincinnati; Anthony C. Zwirgzdas, Fairfield, all of Ohio

[73] Assignee: Sun Chemical Corporation, Fort Lee, N.J.

[21] Appl. No.: 356,045

[22] Filed: May 23, 1989

[51] Int. Cl.$^5$ ............................................. C09B 27/00
[52] U.S. Cl. ................................... 106/496; 534/740; 534/729; 534/748; 534/561
[58] Field of Search ................ 106/496; 534/740, 729, 534/748, 561

[56] References Cited

U.S. PATENT DOCUMENTS

| | | | |
|---|---|---|---|
| 3,905,825 | 9/1975 | Gaetani et al. | 106/496 |
| 4,044,036 | 8/1977 | Hari et al. | 556/32 |
| 4,062,838 | 12/1977 | Cseh et al. | 534/748 |
| 4,113,721 | 9/1978 | Hauser | 534/729 |
| 4,204,871 | 5/1981 | Johnson et al. | 106/20 |
| 4,269,769 | 5/1981 | Moiso et al. | 534/745 |
| 4,285,863 | 8/1981 | Battisti et al. | 534/744 |
| 4,457,783 | 7/1984 | Hamilton et al. | 106/494 |
| 4,462,833 | 7/1984 | Hays et al. | 106/23 |
| 4,468,255 | 8/1984 | Schwartz et al. | 106/494 |
| 4,515,639 | 5/1985 | Dopfer et al. | 106/496 |
| 4,643,770 | 2/1987 | Hays | 106/23 |
| 4,648,907 | 3/1987 | Hays et al. | 106/30 |
| 4,680,057 | 7/1987 | Hays | 106/23 |

FOREIGN PATENT DOCUMENTS

| | | |
|---|---|---|
| 1080115 | 8/1967 | United Kingdom . |
| 1080116 | 8/1967 | United Kingdom . |
| 1156835 | 7/1969 | United Kingdom . |
| 1288044 | 9/1972 | United Kingdom . |
| 1334570 | 10/1973 | United Kingdom . |
| 1551829 | 9/1979 | United Kingdom . |
| 2046770 | 11/1980 | United Kingdom . |

OTHER PUBLICATIONS

Pigment Handbook, vol. III, 1973, pp. 157-164.
T. Varnardakis, "Improving Dispersion of Organic Pigments", Modern Paint and Coatings, Sep. 1985.
Herst et al., "Pigmenting Problems of Yellow Illustration Gravure Printing Inks", deFaget, 30(11), 1976.

*Primary Examiner*—Mark L. Bell
*Assistant Examiner*—Helene Klemanski
*Attorney, Agent, or Firm*—Jack Matalon

[57] ABSTRACT

Diarylide pigments modified with alkylene oxide polymers. The modified pigments are useful in both water-based and solvent-based coating and ink compositions.

20 Claims, No Drawings

DIARYLIDE PIGMENT COMPOSITIONS

BACKGROUND OF THE INVENTION

1. Field of the Invention

The present invention relates to pigments.

2. Description of the Related Art

Diarylide pigments represent an important class of coloring agents used primarily in the manufacture of inks. The most utilized diarylide pigments include, but are not limited to, the following: Pigment Yellow 12, Pigment Yellow 13, Pigment Yellow 14, Pigment Yellow 17 and Pigment Yellow 83.

It is documented in the prior art literature that the addition of fatty primary amines to an aqueous slurry of Pigment Yellow 12, followed by filtration and drying at an elevated temperature, results in a pigment having superior properties (e.g., increased strength, gloss, transparency, and lower rheology) when used to make a solvent-based printing ink, especially a publication gravure type ink (B.P. No. 1,080,835). There are many variations on this technology which have also been patented. Some include the use of diamines to reduce penetration (E.P. No. 57,880), the use of rosin amine (B.P. No. 1,080,116; B.P. No. 1,288,044), the use of heterocyclic amines (B.P. No. 1,334,570), etc. There are also many patents on the process of forming the azomethine additive (aka Schiff's Base or ketimine). Thus, some patents include pre-reaction of the amine and the acetoacetanilide, followed by reaction with tetrazotized DCB (B.P No. 1,334,570; U.S. Pat. No. 4,643,770). Others utilize reaction of the dry Pigment Yellow 12 in a solvent to form the azomethine (U.S. Pat. No. 4,468,255), but most, simply form the additives by drying the presscake containing the amine.

Although the use of the numerous aforementioned amine treatments afford pigments with improved application properties in solvent-based inks (e.g., publication gravure, nitrocellulose packaging, solvent flexo), the use of amine modification for water-based inks has not been exploited, and is within the scope of the present invention. Accordingly, it has been determined that by producing the azomethine compounds of the present invention, diarylide pigment compositions exhibiting significantly improved application properties in both solvent and water-based ink and coating compositions can be obtained. Furthermore, the amine treatments of the prior art possess certain disadvantages, not associated with the azomethine compounds of this invention. For example, there is a marked tendency of the amine treatment to cause a significant green to red shift in the chromophore of diarylide yellow pigments, most notably Pigment Yellow 12. This restricts the use of many of these amine treatments for the production of very green-shade yellows. Another disadvantage is that most amines of the prior art are very odorous and therefore are not usable in certain applications such as packaging ink and are unpleasant to work with in a manufacturing environment.

SUMMARY OF THE INVENTION

Accordingly, it is an object of the present invention to provide improved diarylide pigments for solvent-based and water-based inks and coatings.

The foregoing and other objectives are achieved by providing an azomethine composition of matter having the general formula:

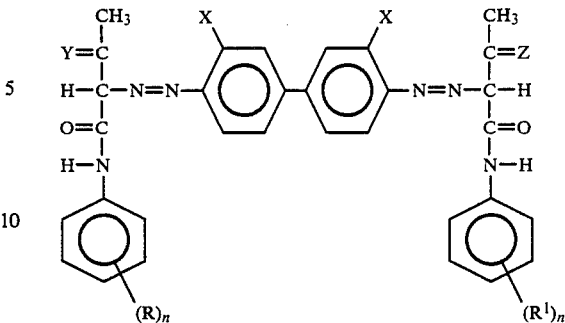

wherein:
R and $R^1$ are H, $CH_3$, $OCH_3$, $OCH_2CH_3$ or Cl;
n is an integer from 1 to 5;
X is Cl, $CH_3$ or $OCH_3$;
Y is $N-R^2$, wherein $R^2$ is an alkylene oxide polymer; and
Z is either O or Y.

The polymer is preferably an ethylene oxide polymer, particularly ethylene oxide/propylene oxide copolymer, and most preferably has the general formula

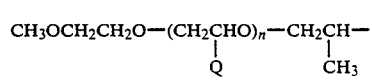

wherein
n=about 4 to about 200; and
Q=H or $CH_3$

A pigment composition is also provided which includes pigment and the above composition of matter. Diarylide pigment is the preferred pigment. The pigment composition may be prepared by reacting a primary amine terminated, alkylene oxide polymer with acetoacetanilide or substituted acetoacetanilide to produce an azomethine, followed by reacting the azomethine with tetrazotized 3,3'-dichlorobenzidine. The composition may also be prepared by contacting a primary amine terminated, alkylene oxide polymer with diarylide pigment. Improved coating and ink compositions are provided which include pigment and the above composition of matter.

DETAILED DESCRIPTION OF THE PREFERRED EMBODIMENTS

The present invention is directed to diarylide pigments having improved properties for use in both solvent- and water-based inks and coatings. The improved diarylide pigments are obtained by modifying the diarylide pigment by reaction with an amine to generate azomethine diarylide pigment derivatives.

The modifying amine may be any primary amine containing alkylene oxide groups. Primary amines that contain an alkylene oxide polymer (or oligomer) are preferred, especially ethylene oxide polymer. Most preferably, the polymer is a propylene oxide/ethylene oxide copolymer. An example of these types of compounds are the Jeffamine M series, available from Texaco Chemical Corporation. These amines have the following general formula:

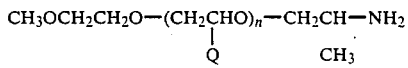

wherein:
n=about 4 to about 200; and
Q=H or CH₃

The modifying amines may include other various moieties, but must contain only one primary amine moiety. Examples of other moieties include carboxylic acid, hydroxyl, ester, branched secondary or tertiary amine moieties, other functionalities and mixtures thereof.

The diarylide pigment may be any of the known type derived from coupling of tetrazotized 3,3'-dichlorobenzidine or dianisidine with acetoacetanilide, acetoacetanilides or mixtures of various acetoacetanilides, and substituted acetoacetanilides. Diarylide yellow and orange pigments are especially useful for modification in accordance with the present invention. Other diarylide pigments may be used. Typical diarylide pigments have the following general formula:

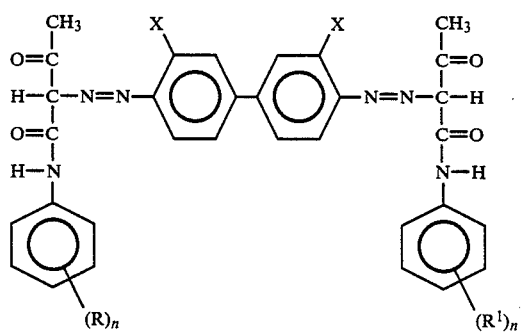

wherein
R and R¹ are H, CH₃, OCH₃, OCH₂CH₃ or Cl;
n is an integer from 1 to 5; and
X is Cl, CH₃ or OCH₃.

Of these types of pigments, the following are preferred: Pigment Yellow 12, Pigment Yellow 13, Pigment Yellow 14, Pigment Yellow 17, Pigment Yellow 83, Pigment Yellow 114, Pigment Yellow 126, Pigment Yellow 127, Pigment Yellow 176, and Pigment Orange 16.

Accordingly, the azomethine compounds of the present invention have the general formula:

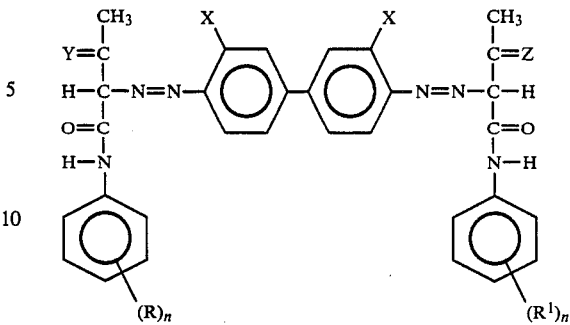

wherein:
R and R¹ are H, CH₃, OCH₃, OCH₂CH₃ or Cl;
n is an integer from 1 to 5;
X is Cl, CH₃, or OCH₃;
Y is N-R², wherein R² is an alkylene oxide polymer; and
Z is either O or Y.

These azomethine compounds should be present in the pigment composition in an amount which will effect the improved results of the invention. Preferably this amount will be up to about 50 wt. % based upon the weight of the pigment product, and most preferably in an amount between about 5 and 30 wt. %. When used in inks and coatings, the azomethine compounds may comprise up to about 25 wt. % of the pigment composition, and preferably comprise between about 0.1 and about 7.5 wt. % of the composition. All percentages expressed in this specification are weight percent unless otherwise specified.

The modified diarylide pigment composition of the present invention may be produced by combination of the pigment or pigment precursors and the modifying amine in any sequence. The amine modifier may be reacted with an acetoacetanilide, followed by reacting the resulting azomethine coupler with tetrazotized 3,3'-dichlorobenzidine to couple it thereto. The azomethine coupler is derived from an acetoacetanilide. Most preferred is acetoacetanilide, acetoacet-2,4-xylidide, acetoacet-o-toluidide, acetoacet-o-anisidide or acetoacet-2,5-dimethoxy-4-chloranilide. The tetrazotized 3,3'-dichlorobenzidine may be formed by reacting 3,3'-dichlorobenzidine with sodium nitrite in the presence of hydrochloric acid. 0-dianisidine may be used in place of, or in combination with 3,3'-dichlorobenzidine.

The following generally illustrates the reaction scheme when the modified diarylide pigments are produced in this manner:

Azomethine Formation

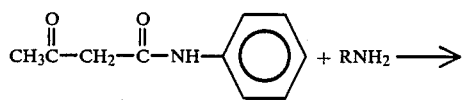

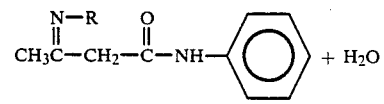

Tetrazonium Salt Formation

-continued

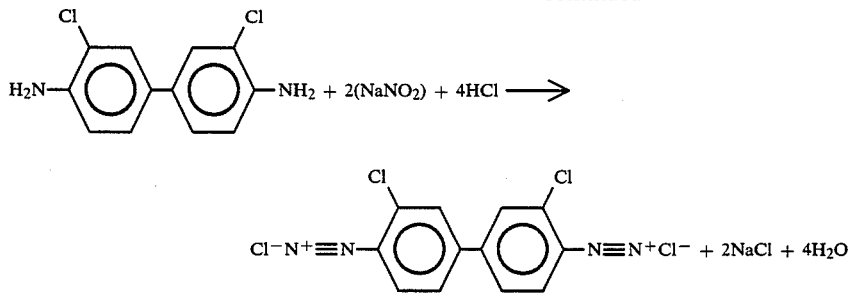

Azomethine Modified Pigment Formation

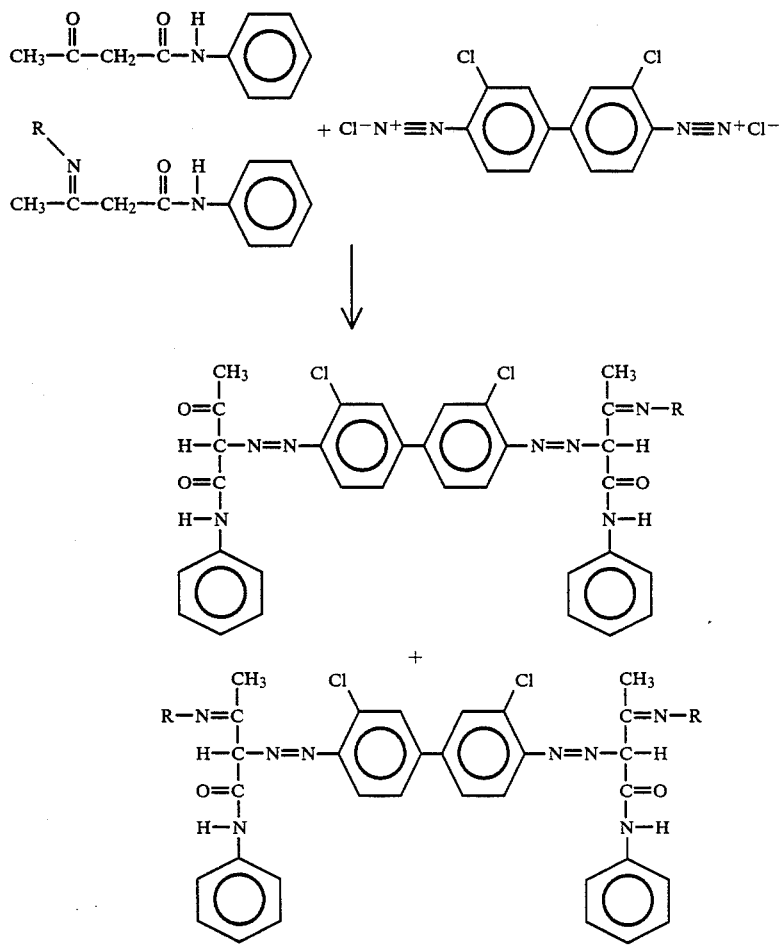

wherein R=poly (alkylene oxide)

Diarylide pigments may also be modified in accordance with the present invention by directly reacting the amine modifier with the diarylide pigment, in the usual manner. The amine is preferably contacted with the pigment presscake, followed by heating the mixture at about 85° C. to remove water.

Alternately, a diarylide pigment presscake may be dried, and the pigment transferred to a solvent, followed by reaction of the amine modifier with the pigment while in the solvent, in the usual manner.

The following generally illustrates the reaction scheme when the modified diarylide pigments are produced in accordance with these methods.

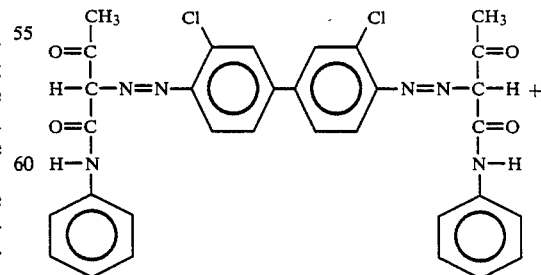

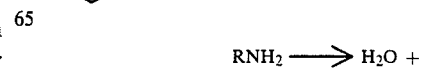

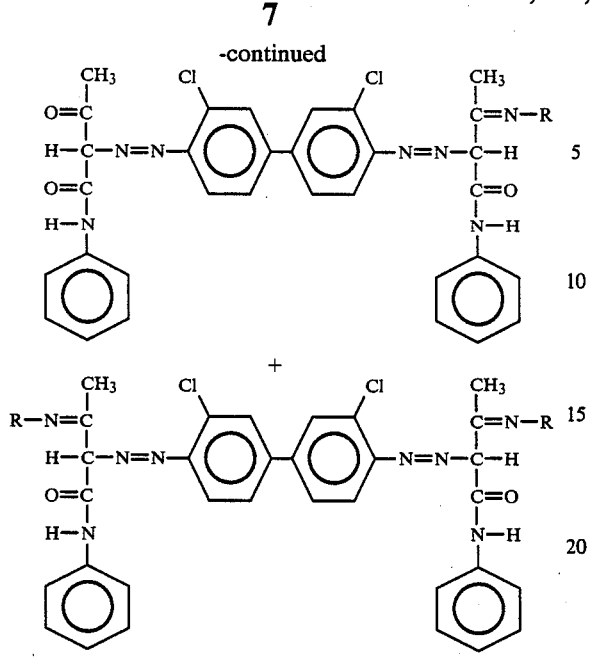

wherein R=poly (alkylene oxide)

To illustrate how diarylide pigment made be modified in accordance with the present invention, the following examples set forth methods whereby pigment compositions were produced:

EXAMPLE 1

Tetrazotized 3,3'-dichlorobenzidine (DCB) was prepared by charging 21.7 parts of 3,3'-dichlorobenzidine to 39.8 parts of 20° Be HCl and 140 parts of an ice/water mixture with constant stirring to form a homogeneous suspension. To this was then added 32.6 parts of 38% sodium nitrite and stirring continued for 1 hour at a temperature of 0°–5° C. The excess nitrous acid was then destroyed by the addition of approximately 0.5 parts sulfamic acid.

A fine suspension of acetoacetanilide (AAA) was prepared by charging 31.7 parts AAA to 400 parts H$_2$O and 33.6 parts of 50% aqueous NaOH, and the mixture was stirred until all of the AAA was dissolved. The temperature of the solution was adjusted to 0°–5° C. with the addition of ice and subsequently the AAA was precipitated by the slow addition of 38.5 parts of 70% acetic acid.

An azomethine coupling component was formed by charging 1.2 parts of AAA to 13.5 parts of Jeffamine M-2070 and heating the mixture to 100°–105° C. with stirring. After 1 hour, the reaction was complete as evidenced by the disappearance of the ketone absorption band in the IR spectrum (approximately 1673 cm$^1$). The resulting azomethine was added to the suspension of AAA immediately prior to coupling with the tetrazotized DCB.

Coupling was then carried out by adding the tetrazotized DCB to the AAA suspension over a period of 1 hour. Stirring was continued until no excess tetrazo remained, and then the slurry was heated to 90°–95° C., stirred 15 minutes, filtered, washed and dried in an oven at 60° C.

Evaluation was performed by charging 25 parts of the pigment to 75 parts of a water-based ink vehicle containing a commercial grade acrylic resin (Joncryl 67; S. C. Johnson) and 300 parts of ⅛ inch stainless steel balls. The mixture was placed on a "Red Devil" paint shaker for 30 minutes, to produce a mill base. The viscosity of the mill base was approximately one-half of that of a conventional Pigment Yellow 12 mill base. Water flexo inks were prepared by letting back the mill bases with additional vehicle to a pigment content of 9.0%. The pigment produced an ink that was approximately 20% stronger, glossier and more transparent than those prepared from the conventional Pigment Yellow 12.

EXAMPLE 2

Example 1 was repeated except that 32.7 parts of acetoacet-o-toluidide (AAOT) was used in place of the AAA. The resulting Pigment Yellow 14 when evaluated as in Example 1, gave similar results versus a conventional Pigment Yellow 14.

EXAMPLE 3

The procedure of Example 1 was followed except the suspension of precipitated AAA and the azomethine coupler were added to the solution of tetrazo. Results were similar to those of Example 1.

EXAMPLE 4

The procedure of Example 2 was followed except the product was converted to a 50% solids presscake, and evaluated by utilizing a shot mill in place of the paint shaker, to disperse the pigment. The resulting ink showed increased gloss, strength, and transparency compared with a conventional Pigment Yellow 14.

EXAMPLE 5

The procedure of Example 1 was repeated, but using 20.5 parts of Jeffamine M-3080.

EXAMPLE 6

The procedure of Example 2 was repeated, but using 1.3 parts AAOT in place of the 1.2 parts of AAA.

EXAMPLE 7

Tetrazotized DCB, a fine suspension of AAA and an azomethine coupling component were obtained by the procedure of Example 1. Coupling was then carried out by simultaneously and separately adding the tetrazotized DCB and azomethine coupling component to the AAA suspension over a period of 1 hour. Stirring was continued until no excess tetrazo remained, and the slurry was then heated to 90°–95° C., stirred for 15 minutes, filtered, washed and dried in an oven at 60° C.

Evaluation was performed by charging 25 parts of the pigment preparation to 75 parts of a publication gravure ink vehicle containing Zn/Ca resinate, toluene, and lecithin, and 150 parts of ⅛th inch stainless steel balls. The mixture was placed on a "Red Devil" paint shaker for 30 minutes to produce a mill base. A finished ink was obtained by diluting the mill base with additional vehicle to a standard viscosity (30 seconds through a #1 Zahn Cup). The pigment preparation produced an ink that was 30% stronger, glossier, and more transparent than an untreated pigment. The pigment preparation was lower in mill base viscosity and greener in color evaluation versus conventional amine treated Yellow 12.

EXAMPLE 8

The procedure of Example 1 was follwed except using 20.9 parts of o-dianisidine in place of the 21.7 parts of 3-3'-dichlorobenzidine to afford 62.2 parts of Pigment Orange 16.

Evaluation was performed in a C-Type packaging gravure ink by charging 25 parts of pigment to 75 parts of a RS-nitrocellulose based grind vehicle with 300 parts of ⅛th inch stainless steel balls. The mixture was placed on a "Red Devil" paint shaker for 30 minutes to afford a mill base, which was then further letdown with 180 parts of a typical maleic resin solution containing toluene and isopropyl alcohol. The ink was then adjusted to print viscosity (22 seconds through a #2 Zahn cup) by the addition of isopropyl acetate. Compared with an ink made from conventionally prepared Orange 16, the ink of this invention was 30% stronger, glossier, more transparent, and lower in rheology. To demonstrate the versatility of the invention, these pigments were also evaluated in a water-based flexographic ink according to the method in Example 1. The Orange 16 of this invention was again stronger, glossier and more transparent than the untreated Orange 16.

EXAMPLE 9

The procedure of Example 1 was followed except using 46.5 parts of acetoacet-2,5-dimethoxy-4-chloro aniline in place of the 31.7 parts of acetoacetanilide, to afford 82.1 parts of Pigment Yellow 83. The resulting material was evaluated as in Example 8, versus an untreated Yellow 83; the former was considerably stronger, glossier and more transparent in both the solvent-based and water-based inks.

EXAMPLE 10

The procedure of Example 1 was followed except using 15.8 parts of acetoacetanilide and 17.0 parts of acetoacet-p-toluidide in place of the 31.7 parts of acetoacetanilide to afford 64.5 grams of Pigment Yellow 114. Versus an untreated sample of Pigment Yellow 114, the pigment preparation of the example showed enhanced gloss, strength, transparency and rheology in both water-based and solvent-based flexographic inks.

As can be seen by the above Examples 1–10, the modified diarylide pigments achieved significantly improved properties. Specifically, the modified diarylide pigments are characterized by a lower viscosity, in addition to improved strength, gloss, and transparency.

The modified diarylide pigments may be used in all applications where diarylide pigments are utilized. They are especially useful in water-based flexographic inks, water-based gravure inks, water-based news inks and any water-based coatings where diarylide pigments are utilized. They are also useful in solvent-based inks, including solvent-flexographic inks, publication gravure inks, various solvent packaging inks, and solvent-based coatings where diarylide pigments are utilized.

While certain representative embodiments and details have been shown for the purpose of illustrating the invention, it will be apparent to those skilled in the art that various changes may be made therein without departing from the spirit or scope of the invention.

What is claimed is:

1. An azomethine composition of matter having the general formula:

$$\begin{array}{c} CH_3 \\ | \\ Y=C \\ | \\ H-C-N=N- \\ | \\ O=C \\ | \\ H-N \\ | \\ (R)_n \end{array} \quad \begin{array}{c} X \\ \\ \end{array} \quad \begin{array}{c} X \\ \\ \end{array} \quad \begin{array}{c} CH_3 \\ | \\ C=Z \\ | \\ -N=N-C-H \\ | \\ C=O \\ | \\ N-H \\ | \\ (R^1)_n \end{array}$$

wherein:
R and $R^1$ are independently selected from the group consisting of H, $CH_3$, $OCH_3$, $OCH_2CH_3$ and Cl;
n is an integer from 1 to 5;
X is selected from the group consisting of Cl, $CH_3$ and $OCH_3$;
Y is $N-R^2$, wherein $R^2$ is an alkylene oxide polymer containing about 4 to about 200 groups; and,
Z is selected from the group consisting of O and Y.

2. A composition of matter as claimed in claim 1, wherein the alkylene oxide polymer is an ethylene oxide polymer.

3. A composition of matter as claimed in claim 2, wherein the ethylene oxide polymer is an ethylene oxide/propylene oxide copolymer.

4. A composition of matter as claimed in claim 3, wherein the copolymer has the general formula:

$$CH_3OCH_2CH_2O-(CH_2CHO)_n-CH_2CH- \\ | \quad\quad\quad | \\ Q \quad\quad CH_3$$

wherein:
n is about 4 to about 200; and
Q is selected from the group consisting of H and $CH_3$.

5. A composition of matter as claimed in claim 4, wherein n is about 4 to about 60.

6. A pigment composition, comprising the composition of matter of claim 1 and at least one pigment.

7. A pigment composition as claimed in claim 6, wherein the composition of matter of claim 1 comprises not more than about 50 wt. % of the composition.

8. A pigment composition as claimed in claim 7, wherein the composition of matter of claim 1 comprises about 5 to about 30 wt. % of the pigment composition.

9. A pigment composition as claimed in claim 6, wherein the additional pigment is a diarylide pigment.

10. A pigment composition as claimed in claim 9, wherein the diarylide pigment is selected from the group consisting of Pigment Yellow 12, Pigment Yellow 13, Pigment Yellow 14, Pigment Yellow 17, Pigment Yellow 83, Pigment Yellow 114, Pigment Yellow 126, Pigment Yellow 127, Pigment Yellow 176, and Pigment Orange 16.

11. A pigment composition, comprising the composition of matter of claim 2 and at least one pigment.

12. A pigment composition as claimed in claim 11, wherein the composition of matter of claim 2 comprises not more than about 50 wt. % of the pigment composition.

13. A pigment composition as claimed in claim 12, wherein the composition of matter of claim 2 comprises about 5 to about 30 wt. % of the pigment composition.

14. A pigment composition as claimed in claim 11, wherein the additional pigment is a diarylide pigment.

15. A pigment composition as claimed in claim 14, wherein the diarylide pigment is selected from the group consisting of Pigment Yellow 12, Pigment Yellow 13, Pigment Yellow 14, Pigment Yellow 17, Pigment Yellow 83, Pigment Yellow 114, Pigment Yellow 126, Pigment Yellow 127, Pigment Yellow 176, and Pigment Orange 16.

16. A pigment composition, comprising the composition of matter of claim 3 and at least one pigment.

17. A pigment composition as claimed in claim 16, wherein the composition of matter of claim 3 comprises not more than about 50 wt. % of the pigment composition.

18. A pigment composition as claimed in claim 17, wherein the composition of matter of claim 3 comprises about 5 to about 30 wt. % of the pigment composition.

19. A pigment composition as claimed in claim 16, wherein the pigment is a diarylide pigment.

20. A pigment composition as claimed in claim 19, wherein the diarylide pigment is selected from the group consisting of Pigment Yellow 12, Pigment Yellow 13, Pigment Yellow 14, Pigment Yellow 17, Pigment Yellow 83, Pigment Yellow 114, Pigment Yellow 126, Pigment Yellow 127, Pigment Yellow 176, and Pigment Orange 16.

* * * * *